Dec. 20, 1966    R. C. McCALL ET AL    3,293,432
LARGE AREA SCINTILLATION DETECTOR HAVING A PLURALITY OF LIGHT
TRANSMITTING SHEETS
Filed Nov. 1, 1963
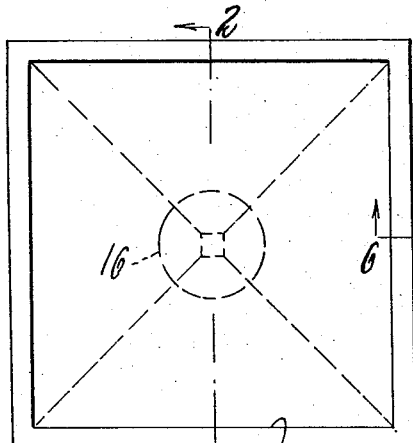
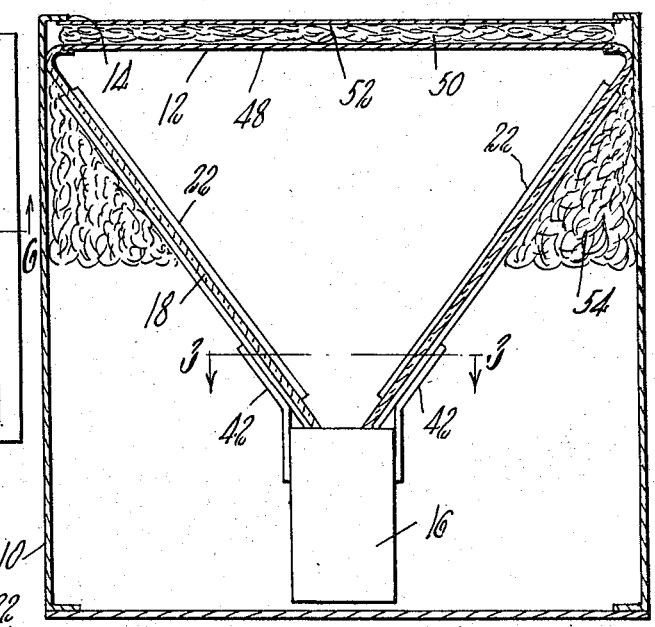
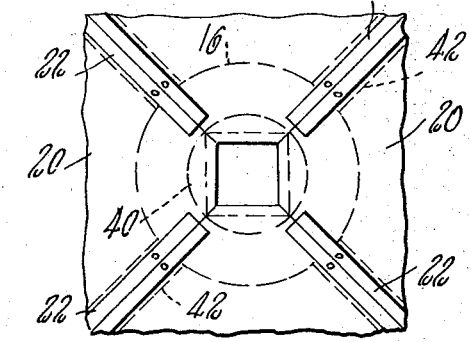
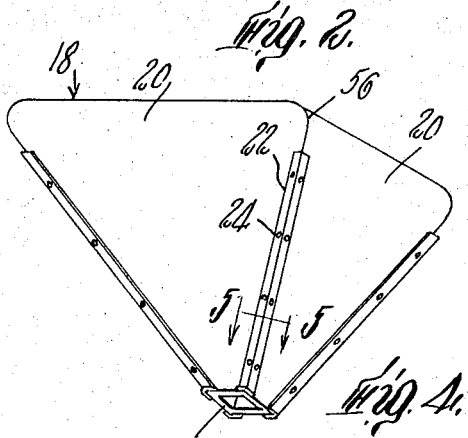
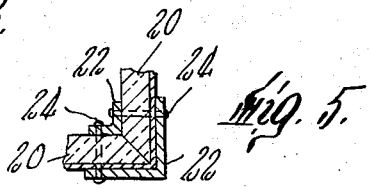
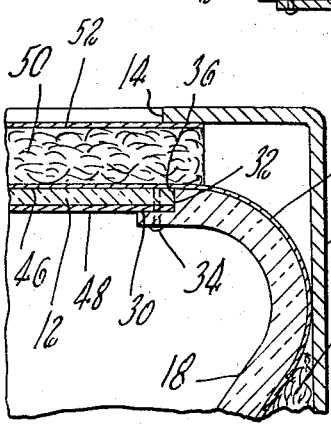
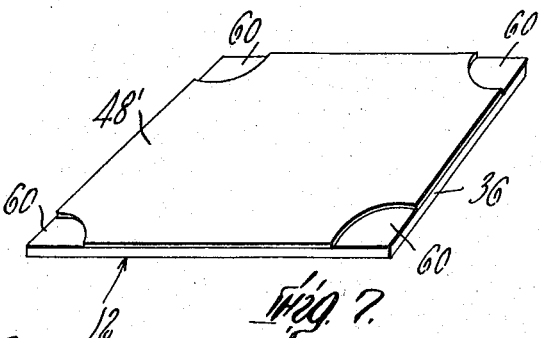

United States Patent Office 3,293,432
Patented Dec. 20, 1966

3,293,432
LARGE AREA SCINTILLATION DETECTOR HAVING A PLURALITY OF LIGHT TRANSMITTING SHEETS
Richard C. McCall, Watertown, and Alfred C. Jasins, Waltham, Mass., assignors to Controls For Radiation, Inc., Cambridge, Mass., a corporation of Massachusetts
Filed Nov. 1, 1963, Ser. No. 320,770
9 Claims. (Cl. 250—71.5)

This invention relates to radiation detection apparatus and more particularly to radiation detection apparatus of the type employing relatively large area detectors of the scintillation type.

Among the several devices known for detecting radiation is the scintillator type of element which produces light in response to impinging radiation, typically a phosphor in which a flash of light is produced by an alpha particle or other ionizing event. Where it is desired to supervise a relatively large area, a scintillator material such as p-terphenyl may be employed either in a liquid vehicle such as xylene or toluene, or a solid plastic material such as polyvinyl toulene. Such radiation detectors are useful in monitoring the existence of dangerous amounts of an ionizing radiation adjacent a radar installation or atomic reactor, for example.

When radiation impinges on the scintillator element, a flash of light is produced which is detected, for example, by a photomultiplier type of detector to produce an electrical signal indicative of the sensed radiation. However, it is difficult to optically couple a large scintillator to the relatively small photocathode of a photomultiplier in such a manner that a large fraction of the light is detected. A conventional transition between a large area scintillator and the detector is a solid light pipe connected between one face of the scintillator and the photocathode with the other faces of the scintillator being bounded by a reflecting medium such as aluminum foil or magnesium oxide. Such a light pipe is difficult and expensive to fabricate. In addition, the response of the system employing such coupling elements is not uniform but rather varies depending on the location of the point of impingement of radiation on the scintillator sheet relative to the face to which the transition member is coupled.

Accordingly, it is an object of this invention to provide novel and improved large area radiation detection apparatus of the scintillator type.

Another object of the invention is to provide a novel and improved coupler for use with a large area radiation detector of the scintillator type and a transducer such as a photomultiplier.

Another object of the invention is to provide a novel and improved light coupling structure for use with a large area scintillator that is relatively inexpensive to manufacture.

A further object of the invention is to provide a radiation detector of the large area scintillator type that is more efficient than detector arrangements of that class that have been heretofore available.

Still another object of the invention is to provide a large area scintillator that has a response substantially independent of the location of ionizing radiation impinging on the scintillator.

In accordance with the invention a novel coupler of light pipe material having internal reflection characteristics connects the entire periphery of a large area scintillator to a light sensor. The large area scintillator may be of conventional configuration and is usually of the solid type although liquid types may, on occasion, be suitable. The thickness of the scintillator should be less than five percent of its maximum linear dimension in order to provide significant internal reflection within the scintillator. The coupler has an end surface disposed in optically coupling relation to the face of the scintillator and may be of generally tubular configuration. In typical arrangements the scintillator and coupler effectively form a hollow bulb with the end surface of the tubular section opposite the scintillator adapted to be exposed in optically coupled relation with the transducer. Where the transducer has a smaller sensing area than the area of the scintillator, as is the usual case, the coupling section may be uniformly tapered so that its smaller annular end surface will overlie and register with the sensitive area of the transducer.

This radiation detector configuration enables a large percentage of the light produced by the scintillator in response to impinging radiation to be coupled to the transducer. Detectors constructed in accordance with the invention have a more uniform response to impinging radiation and also are more efficient than comparable types of detectors heretofore available. In some detector arrangements it is desirable to permit light from certain areas of the scintillator element to be transmitted directly to the detector through the interior of the coupling section rather than through the light pipe wall portion thereof to control the uniformity of detector response.

Further objects, features and advantages of the invention will be seen as the following description of a preferred embodiment progresses, in conjunction with the drawing, in which:

FIG. 1 is a front view of radiation detector apparatus constructed in accordance with the invention;

FIG. 2 is a sectional view taken along the line 2—2 of FIG. 1 showing details of the apparatus including the relationship of the scintillator element, the tubular coupling section and the light sensor;

FIG. 3 is a sectional view taken along the line 3—3 of FIG. 2 showing details of the coupling section exit aperture and the mounting of the light sensor;

FIG. 4 is a perspective view of the tubular coupling section employed in the detector apparatus shown in FIGS. 1–3;

FIG. 5 is an enlarged sectional view taken along the line 5—5 of FIG. 4 of the clamping arrangement employed for holding elements of the tubular coupling section together;

FIG. 6 is an enlarged sectional view taken along the line 6—6 of FIG. 1 of the clamping of the tubular coupling section to the scintillator sheet; and FIG. 7 is a perspective view of the interior of the bulb showing a modified shielding configuration that may be employed in the apparatus.

As shown in FIGS. 1 and 2, the radiation detector is mounted in a casing 10 which may be a suitable material for microwave shielding such as aluminum for example. The scintillation member 12 is a sheet that is disposed behind an aperture window 14 in the casing 10 and is coupled to a light detector 16 by means of a tubular light transmitting member 18. A suitable scintillator material is terphenyl dissolved in a plastic such as polyvinyl toluene or in a proprietary material to provide a scintillator of the type manufactured by the Pilot Chemical Company of Watertown, Massachusetts. In certain applications other types of scintillators including those of the liquid type which employ terphenyl dissolved in an organic solvent such as xylene or toluene may be utilized. In the illustrated arrangement the scintillator is a solid sheet 12 of rectangular configuration ⅛" thick and 24" square. However, it will be obvious that circular, spherical sections or other configurations of the scintillator 12 may be employed.

In the illustrated embodiment, the coupling member 18 comprises four identical light pipe sheets 20 of generally triangular configuration with the base of each turned inwardly in a smooth curve as indicated in FIGS. 4–6. The sheets 20 are made of an acrylic resin such as that sold under the trademarks Plexiglas or Lucite and typically are in the order of 1/8"–1/4" in thickness and in the illustrated embodiment are 1/4" in thickness. The four sheets are secured together by suitable means such as clamping or cementing in frusto-pyramidal configuration. In the illustrated embodiment angle irons 22 and bolts 24 are used for this purpose. The resulting annular end surface 26 is a smoothly finished plane which is adapted to be optically coupled with the input of the transducer, typically a photomultiplier window, so that there is minimal light loss at that point. A typical dimension of this annular end surface is 1 3/8" on a side.

As best indicated in FIG. 6, the pyramidal coupling section 18 has its base portion turned inwardly and is partly relieved to form a continuous scintillator sheet seating and support surface 30 adjacent a continuous coupling output wall 32. The scintillator sheet 12 is secured on surface 30 of the coupling section 18 by means of suitable fastening means such as bolts 34 so that its entire peripheral wall 36 is optically coupled to surface 32. The gap between scintillator wall 36 and coupler wall 32 may be filled with an optical coupling medium such as silicone grease to maximize the light transmission between the edge of the scintillator sheet and the light coupler. The scintillator sheet 12 and coupler 18, as thus assembled, form a hollow bulb.

The light detector 16, typically a photomultiplier tube, has an input window 40 that is diagrammatically shown in FIG. 3. Disposed closely adjacent this window is the annular end surface 26 of the tubular coupler 18 so that it is in optically coupled relationship therewith. The photomultiplier is secured to the coupler 18 by suitable means such as straps 42 which are bolted both to the photomultiplier tube housing and to the tubular section 18.

Where the detector is to be used for sensing ionizing radiation, as for example adjacent radar installations, shields 46, 48, that are opaque to energy in the visible spectrum but which transmit the radiation to be sensed, such as aluminum foil, may be disposed on either side of the scintillator sheet 12 and may extend over the outer surface of the coupling member 18 so as to minimize light radiation losses therefrom. In front of the outer shield 46 a buffer layer 50 of a polystyrene plastic, such as that sold under the trademark Styrafoam, is employed and over that is disposed a protective sheet 52 of a polyester film such as that sold under the trademark Mylar. The assembly is secured within the case 10 by suitable means 54 such as a foaming-in-place plastic.

In operation, one or more of these large area detector units are disposed in the area under surveillance. When radiation impinges on the scintillator sheet 12, a phosphor in the scintillator is activated and light is produced which is transmitted through the scintillator sheet 12 and coupler 18 to the photomultiplier 16. The light radiates in all directions in the plane of the scintillator sheet from the activated phosphor and as the coupler surrounds the entire peripheral face of the scintillator a substantial amount of the generated light is transmitted thereto. The light is funnelled through the tubular wall of the coupling section down to the annular end surface 26 for sensing by the photomultiplier tube or other detector 16. Thus the amount of light sensed to the detector as the result of a radiation particle impinging on a particular point of the scintillator sheet 12 is substantially independent of the location of that point on the sheet. For example, if radiation should impinge at the center of the sheet, an equal amount of light would be coupled from all four edges to the detector 16. However, should the radiation impinge near one corner or one edge, a greater amount of light would be coupled through the adjacent faces but a smaller portion would be coupled by the face surfaces that are farther away. The total amount of light that is coupled to the detector in response to a given amount of radiation is substantially independent of the location of the radiation impingement on the scintillator. This enables a much greater usefulness of the apparatus when it is desired to measure dosage or the magnitude of the impinging radiation.

In certain configurations of the coupler, as for example the pyramid configuration shown in the drawing, some reduction in light transmission may occur at the corners 56 due to the joints between adjacent sheets and/or the fabrication of the curved portions 58 of the sheets. In such case, portions of the lower reflective shield 48 at the corners may be removed as shown in FIG. 6 (shield 48') to expose corner portions 60 of the scintillator sheet 12. In this manner light generated where radiation impinges in an area 60 is coupled to the sensor both by direct transmission inside the tube 18 and through the light pipe walls of the tube 18. The size and configuration of these removed portions of the reflective shield 48 may be varied to provide the desired response of the detector 16 to impinging radiation.

While a preferred embodiment of the invention and modification thereof has been shown and described, additional modifications will be obvious to those skilled in the art. For example, the coupler rather than being of pyramidal configuration, may be of conical configuration. Also, the scintillator sheet rather than being planar may be curved in one or more dimensions and/or the scintillator and coupler may be fabricated as a unit in bulb form. Further modifications of the disclosed structure will be obvious to those skilled in the art and therefore it is not intended that the invention be limited to the disclosed embodiment or to details thereof and departures may be made therefrom within the spirit and scope of the invention as defined in the claims.

What is claimed is:

1. Radiation detection apparatus comprising a planar scintillator,
   said scintillator having a thickness in the order of one percent of its maximum linear dimension and including phosphor means for producing light in response to ionizing radiation impinging thereon,
   a coupler comprising a plurality of sheets of light transmitting material having internal reflection characteristics,
   said sheets being secured together to form a hollow tube,
   each sheet having a first end surface at one end thereof immediately adjacent and optically coupled to the corresponding peripheral face of said scintillator, and a second end surface at the opposite end thereof,
   and a light sensor optically coupled to said second end surfaces for response to light transmitted through said coupler.

2. The detection apparatus as claimed in claim 1 and further including light reflective shielding disposed on a surface of said scintillator.

3. The detector apparatus as claimed in claim 2 wherein a portion of a surface of said scintillator is exposed to enable the transmission of light directly to said light sensor.

4. The detector apparatus as claimed in claim 1 wherein said light transmitting sheets are of uniform thickness.

5. The detector apparatus as claimed in claim 1 wherein said scintillator includes terphenyl.

6. The detector apparatus as claimed in claim 1 wherein said light transmitting sheets includes an acrylic resin.

7. Radiation detection apparatus comprising a planar scintillator having a polygonal periphery,
said scintillator having a thickness in the order of one percent of its maximum linear dimension and including phosphor means for producing light in response to ionizing radiation impinging thereon,
a pyramidal coupler comprising a plurality of generally triangular sheets of light transmitting material having internal reflection characteristics,
said sheets corresponding in number to the number of sides of said scintillator and being secured together to form a hollow pyramid,
each sheet having a first end surface at one end thereof immediately adjacent and optically coupled to the corresponding peripheral face of said scintillator, and a second end surface at the opposite end thereof,
and a light sensor optically coupled to said second end surfaces for response to light transmitted through said pyramidal coupler.

8. Radiation detection apparatus comprising a planar scintillator having a polygonal periphery,
said scintillator including phosphor means for producing light in response to ionizing radiation impinging thereon,
a pyramidal coupler comprising a plurality of generally triangular sheets of light transmitting material having internal reflection characteristics,
said sheets corresponding in number to the number of sides of said scintillator and being secured together to form a hollow pyramid,
each sheet having at one end thereof a seating surface for receiving said scintillator in supporting relationship and a first end surface immediately adjacent said seating surface so that the peripheral face of said scintillator corresponding to that sheet is optically coupled to said first end surface,
and a second end surface at the opposite end thereof,
a photomultiplier optically coupled to said second end surface for response to light transmitted through the sheets of said pyramidal coupler from said scintillator,
a housing surrounding said pyramidal coupler and permitting ionizing radiation from predetermined directions only to impinge on said scintillator,
and light reflective means disposed on both sides of said scintillator for enhancing the internal reflection characteristics thereof.

9. Radiation detection apparatus comprising a planar scintillator having a polygonal periphery,
said scintillator having a thickness in the order of one percent of its maximum linear dimension and including terphenyl for producing light in response to ionizing radiation impinging thereon,
a pyramidal coupler comprising a plurality of generally triangular sheets of an acrylic resin,
said sheets corresponding in number to the number of sides of said scintillator and being secured together to form a hollow pyramid,
each sheet having at one end thereof a seating surface for receiving said scintillator in supporting relationship and a first end surface immediately adjacent said seating surface so that the peripheral face of said scintillator corresponding to that sheet is optically coupled to said first end surface,
and a second end surface at the opposite end thereof,
a photomultiplier optically coupled to said second end surface for response to light transmitted through the sheets of said pyramidal structure from said scintillator,
a housing surrounding said pyramidal coupler permitting ionizing radiation from predetermined directions only to impinge on said scintillator,
and light reflective means disposed on at least a portion of the inner surface of said scintillator for enhancing the internal reflection characteristics thereof.

References Cited by the Examiner

UNITED STATES PATENTS

| 2,797,683 | 7/1957 | Aiken | 88—1 |
| 2,829,264 | 4/1958 | Garrison | 250—71.5 |
| 2,855,520 | 10/1958 | Stoddard et al. | 250—71.5 |
| 2,990,474 | 6/1961 | Scherbatzkoy | 250—71.5 X |

OTHER REFERENCES

Nucleonics, Fluorescent Liquids for Scintillator Counters, March 1951, pp. 32 to 39.

RALPH G. NILSON, *Primary Examiner.*

S. ELBAUM, *Assistant Examiner.*